(12) United States Patent
Ikushima et al.

(10) Patent No.: US 7,649,448 B2
(45) Date of Patent: Jan. 19, 2010

(54) STOP LAMP LIGHTING CONTROLLER

(75) Inventors: Yoshihiro Ikushima, Iida (JP); Yutaka Ohkubo, Iida (JP); Kenichi Kinbara, Iida (JP)

(73) Assignee: OMRON Corporation, Kyoto (JP)

( * ) Notice: Subject to any disclaimer, the term of this patent is extended or adjusted under 35 U.S.C. 154(b) by 490 days.

(21) Appl. No.: 11/731,756

(22) Filed: Mar. 29, 2007

(65) Prior Publication Data

US 2007/0229245 A1    Oct. 4, 2007

(30) Foreign Application Priority Data

Mar. 31, 2006    (JP) ............................. 2006-099526

(51) Int. Cl.
   *B60Q 1/44* (2006.01)
(52) U.S. Cl. ..................... 340/479; 340/468; 340/463; 340/464; 701/1; 701/36; 701/70
(58) Field of Classification Search ................ 340/463, 340/464, 466, 467, 468, 471, 472; 701/1, 701/36, 70
See application file for complete search history.

(56) References Cited

U.S. PATENT DOCUMENTS

| | | | | |
|---|---|---|---|---|
| 3,683,329 A | * | 8/1972 | Sattler et al. | 340/479 |
| 3,975,706 A | * | 8/1976 | Kato | 340/454 |
| 4,663,609 A | * | 5/1987 | Rosario | 340/479 |
| 6,111,500 A | * | 8/2000 | Wilson | 340/479 |

* cited by examiner

Primary Examiner—Toan N Pham
Assistant Examiner—Kerri McNally
(74) Attorney, Agent, or Firm—Weaver Austin Villeneuve & Sampson LLP (57) ABSTRACT

The invention provides a stop lamp lighting controller able to improve durability of a relay while unnecessary automatic turning on and off are avoided. A stop lamp is lit through a main line at a gentle braking time. At a sudden braking time, the stop lamp is switched on and off by disconnecting and connecting the main line in a predetermined period. At a breakdown time of the main line, the main line is switched to a subline and a lighting function of the stop lamp is secured. The main line is formed when both a first relay and a second relay are in a de-energizing state. The main line is disconnected and connected by periodically opening and closing the first relay. The main line is switched to the subline by energizing the second relay.

2 Claims, 6 Drawing Sheets

STOP LAMP LIGHTING CONTROLLER

This application claims priority on Japanese Patent Application 2006-99526 filed Mar. 31, 2006.

BACKGROUND OF THE INVENTION

1. Field of the Invention

The present invention relates to a stop lamp lighting controller of a vehicle such as an automobile, and particularly relates to a stop lamp lighting controller capable of performing "automatic turning on and off control" of a stop lamp.

2. Background Art

In accordance with "Security standard of road conveyance vehicle" (Ordinance No. 67 of the Transport Ministry of Japan on Jul. 28, 1951), a display device (red light) for displaying an operating situation of a braking device of a vehicle such as an automobile to a following vehicle behind must be provided on a rear face. Specifically, in a two-wheeled vehicle and a bicycle provided with a motor, one brake light must be provided on its rear face. Further, in an automobile such as a passenger car, one brake light must be provided on each of left and right sides of the rear face (two brake lights in total), and one auxiliary brake light must be provided in a predetermined high position of the rear face at the center. The brake light is generally called a brake lamp or a stop lamp, and the auxiliary brake light is called a high mount stop lamp. In this specification, however, these lights (the brake light and the auxiliary brake light) are not distinguished and are generically referred to as "stop lamp".

The stop lamp is normally switched off, and is lighted in a red color when the driver performs a braking operation. Such a binary operation (switching light on and off) has the demerit in that the amount of information to the following vehicle is small because braking operations include not only the usual gentle braking for slow deceleration but also sudden braking for avoiding a danger. A mechanism capable of displaying three different kinds of conditions including the sudden braking, gradual braking and non-braking is desirable.

The brake pedal is sometimes intermittently stepped on many times. When this operation is performed, the stop lamp is repeatedly switched on and off. Accordingly, it is seen as if the stop lamp is turned on and off, calling attention to the following vehicle. Accordingly, if this operation is used together, the above three kinds of state displays may be considered to be realized.

It can be said that the above operation (intermittent stepping on the brake pedal) corresponds to a so-called pumping brake on a slippery road surface such as a frozen road. However, considerable practice and experience are required to instantly operate the pumping brake at an emergency, and it is not everybody that can be expected to pump on the brake pedal. Moreover, a device such as an ABS (antilock brake system) for preventing a wheel lock at a braking time is mounted to many vehicles nowadays. Accordingly, there is a reduced opportunity for operating the pumping brake. It is also pointed out in the first place that affinity of ABS and the pumping brake is bad (braking distance becomes long). Accordingly, it is unreasonable that the three states of "normal state (non-braking state)", "gentle braking state" and "sudden braking state" are intended to be discriminated and displayed by the stop lamp in addition to the above operation (intermittent stepping-in of the brake pedal).

Therefore, an automation technique replaced with the above operation (the intermittent stepping-in of the brake pedal), i.e., a technique able to automatically turn the stop lamp on and off without manually intermittently stepping-in the brake pedal is required. In the present law "Security standard of road conveyance vehicle" (article 39), there is a provision of "the brake light has no structure automatically turned on and off - - - ". In the present invention, it is intended that the brake light (stop lamp) is automatically turned on and off, but no violation of the law is encouraged. There is recently a movement (ECE Reg 48 revised proposal) for relaxing such regulation. Therefore, a social useful technique is intended to be precedently disclosed in conformity with this movement.

For example, "a stop lamp turning on and off device" described in JP-A-2000-52857 is known as the related art relative to the automatic turning on and off of the brake light (stop lamp).

Figure 6:
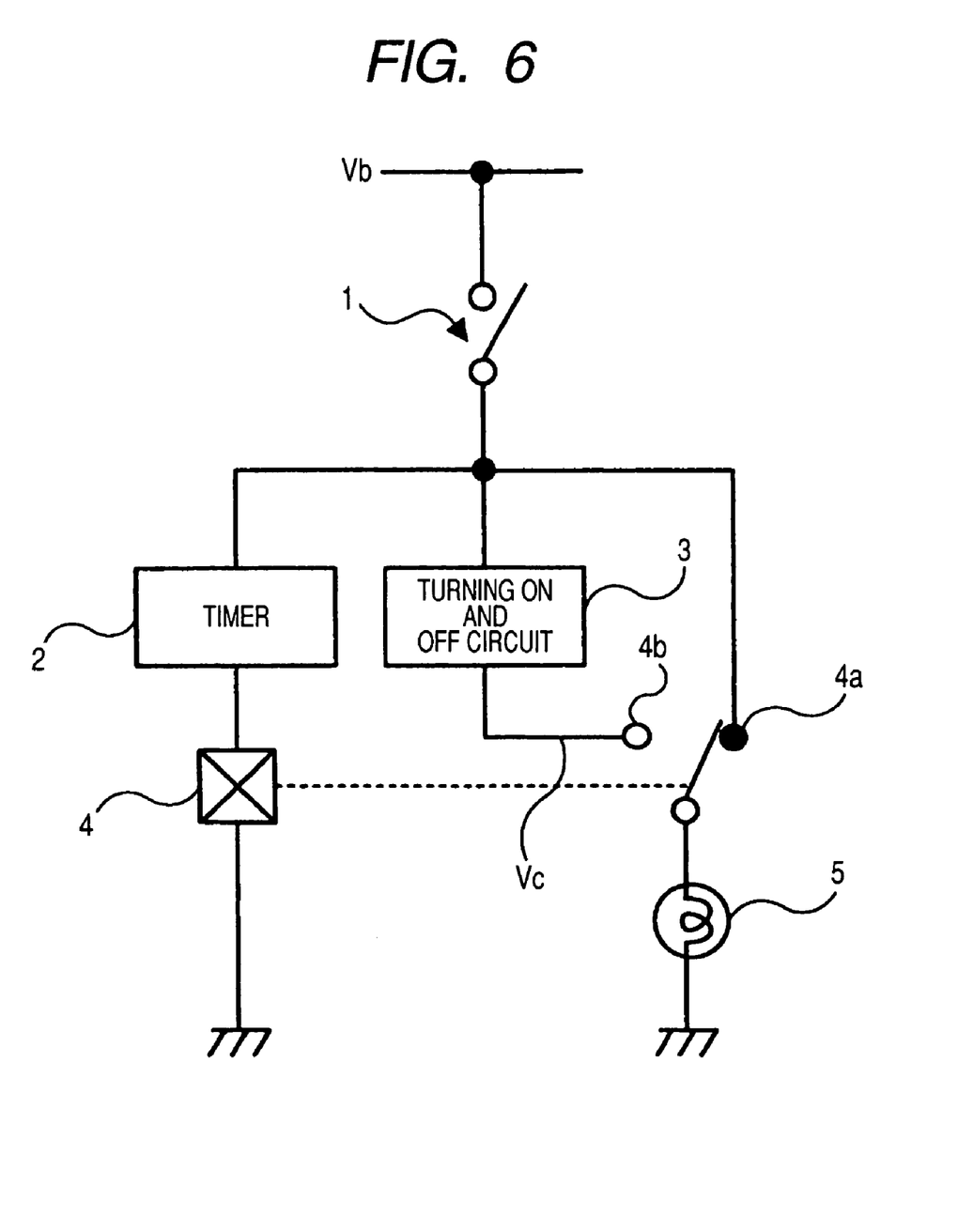
FIG. 6 is a schematic constructional view of the related art.

FIG. 6 is a schematic constructional view of the related art. However, this view is set to be easily seen by partially correcting the view of the related art. In this view, a brake switch 1 is a switch turned on when the braking operation is performed by a driver. For example, a switch, etc. arranged together in the brake pedal correspond to this brake switch 1. When the brake switch 1 is turned on, a battery voltage Vb is supplied to a timer 2 and a turning on and off circuit 3 through this brake switch 1.

A relay 4 is connected to the timer 2. The timer 2 energizes this relay 4 during a predetermined time from just after the battery voltage Vb is supplied. The relay 4 has a normally closed terminal 4a (hereinafter similarly also called a normally closed contact or simply called a contact in a certain case) and a normally open terminal 4b (hereinafter similarly called a normally open contact or simply called a contact in a certain case). The relay 4 supplies the battery voltage Vb to a stop lamp 5 through the normally closed terminal 4a while a de-energizing state is set and the brake switch 1 is turned on. While an energizing state is set and the brake switch 1 is turned on, the relay 4 supplies a driving voltage Vc from the turning on and off circuit 3 to the stop lamp 5 through the normally open terminal 4b.

The turning on and off circuit 3 generates the driving voltage Vc repeating on and off in a predetermined period while the battery voltage Vb is supplied through the brake switch 1.

Accordingly, in accordance with this construction, the driving voltage Vc from the turning on and off circuit 3 is supplied to the stop lamp 5 through the normally open terminal 4b of the relay 4 during a predetermined time from just after the brake operation is performed by the driver. Accordingly, in the meantime, the stop lamp 5 is repeatedly lighted and put out in conformity with turning on and off periods of the driving voltage Vc so that the stop lamp 5 can be automatically turned on and off. After a predetermined time has passed, the relay 4 is de-energized so that the relay 4 supplies the battery voltage Vb to the stop lamp 5 through the normally closed terminal 4a (if the brake switch 1 is still turned on). Thus, the stop lamp 5 can be always set to a lighting state.

There are the following problems in the related art.

(1) It is defective in consideration with respect to circumference.

As mentioned above, the brake operation can be divided into braking (gentle braking) for mere deceleration and braking (sudden braking) for emergent avoidance. Braking to be turned on and off with respect to the stop lamp 5 is "sudden braking", and is not required in the case of the gentle braking. This is because, when a frequent braking operation is performed within a vehicle series of a traffic snarl, repetitious turning on and off of the stop lamp before one's eyes seen from a crew member of a subsequent vehicle gets on one's nerves and the crew member has a troublesome feeling. Thus, in the related art, the gentle braking and the sudden braking are not distinguished and the stop lamp 5 is turned on and off at all braking times. Accordingly, a problem exists in that unnecessary turning on and off are not refused and it is defective in consideration with respect to the circumference (particularly, the subsequent vehicle).

(2) Durability of relay

Durability (life) of the relay is generally discussed by a maximum opening-closing number (or time number). When the relay of x times with respect to the maximum opening-closing number is opened and closed y times every day, it is said that life is exhausted in x/y days, etc. When the related art is considered on the basis of this matter, the relay 4 is opened and closed at one time every time the braking operation is performed at one time in the related art. Accordingly, for example, if the maximum opening-closing number of the relay 4 is set to 1000000 times and a braking number per one day is 1000 times for convenience, it is calculated that life is exhausted in 1000000 times÷1000 times=1000 days, i.e., about 2.7 years. 1000 times as the braking number per one day might be too many, but is a time number able to be sufficiently generated within a traffic snarl meanderingly continued, etc. It can be said that the life of 2.7 years is short particularly as a relay for vehicle mounting. Accordingly, in the related art, a problem exists in that durability of the relay is not sufficient.

SUMMARY OF THE INVENTION

Therefore, an object of the present invention is to provide a stop lamp lighting controller able to improve the durability of the relay while unnecessary automatic turning on and off are avoided.

The present invention resides in a stop lamp lighting controller for supplying a battery voltage to a stop lamp through a braking detection switch element turned on at a braking operation time of a vehicle, and comprising:

a main line and a subline arranged in parallel between the braking detection switch element and the stop lamp;

a first relay for setting the main line to a conducting state in a de-energizing state, and setting the main line to a non-conducting state in an energizing state;

a second relay for selecting the main line in the de-energizing state and supplying the battery voltage from the braking detection switch element to the stop lamp through the main line, and selecting the subline in the energizing state and supplying the battery voltage from the braking detection switch element to the stop lamp through the subline;

sudden braking state judging means for judging a sudden braking state;

first control means for controlling the first relay to the de-energizing state when no sudden braking state is judged by the sudden braking state judging means, and also periodically controlling the first relay to the de-energizing state and the energizing state when the sudden braking state is judged by the sudden braking state judging means;

abnormality judging means for judging an abnormality of the main line; and second control means for controlling the second relay to the de-energizing state when no abnormality of the main line is judged by the abnormality judging means, and also controlling the second relay to the energizing state when the abnormality of the main line is judged by the abnormality judging means.

Further, the present invention resides in a stop lamp lighting controller for supplying a battery voltage to a stop lamp through a braking detection switch element turned on at a braking operation time of a vehicle, and comprising:

a main line and a subline arranged in parallel between the braking detection switch element and the stop lamp;

a switch circuit for setting the main line to a conducting state in a turning-on state, and setting the main line to a non-conducting state in a turning-off state;

a relay for selecting the main line in the de-energizing state and supplying the battery voltage from the braking detection switch element to the stop lamp through the main line, and selecting the subline in the energizing state and supplying the battery voltage from the braking detection switch element to the stop lamp through the subline;

sudden braking state judging means for judging a sudden braking state;

first control means for controlling the switch circuit to the turning-on state when no sudden braking state is judged by the sudden braking state judging means, and also periodically controlling the switch circuit to the turning-on state and the turning-off state when the sudden braking state is judged by the sudden braking state judging means;

abnormality judging means for judging an abnormality of the main line; and second control means for controlling the relay to the de-energizing state when no abnormality of the main line is judged by the abnormality judging means, and also controlling the relay to the energizing state when the abnormality of the main line is judged by the abnormality judging means.

In accordance with the present invention, both the first relay and the second relay attain the de-energizing state at the braking time (gentle braking time) except for the sudden braking. Accordingly, even when this gentle braking is performed many times, no gentle braking exerts an influence on durability of the relay. On the other hand, at the sudden braking time, the first relay repeats energization/de-energization (opening and closing) in a predetermined period. Accordingly, the durability of the relay is damaged by frequency of these opening and closing, but its degree is very small in comparison with the above related art. This is because the generating frequency of the sudden braking is very rare.

Further, in accordance with the present invention, turning on and off of the stop lamp are limitedly performed at only an emergent time (sudden braking time). In other words, the stop lamp is merely lighted at the gentle braking time except for the sudden braking time. Accordingly, it does not trouble a subsequent vehicle, etc.

Further, if a breakdown is generated in the main line, the main line is immediately switched to the subline, and a lighting function of the stop lamp can be restored. In this case, no stop lamp can be turned on and off, but at least the stop lamp can be lighted. Accordingly, no trouble of traffic safety is caused.

DESCRIPTION OF THE PREFERRED EMBODIMENTS

An embodiment mode of the present invention will next be explained on the basis of the drawings. The specification of various details, real examples and illustrations of numerical values, character series and other symbols in the following explanation are strictly references for clarifying the idea of the present invention. It is clear that no idea of the present invention is limited by all or one portion of these contents. Further, with respect to a publicly known technique, a publicly known procedure, a publicly known architecture, a publicly known circuit construction, etc. (hereinafter called "publicly known matters"), explanations of their details are avoided to simplify the explanations, and all or one portion of these publicly known matters is not intentionally excluded. Such publicly known matters can be known by persons skilled in the art at an application time point of the present invention, and are therefore included in the following explanation.

Figure 1:
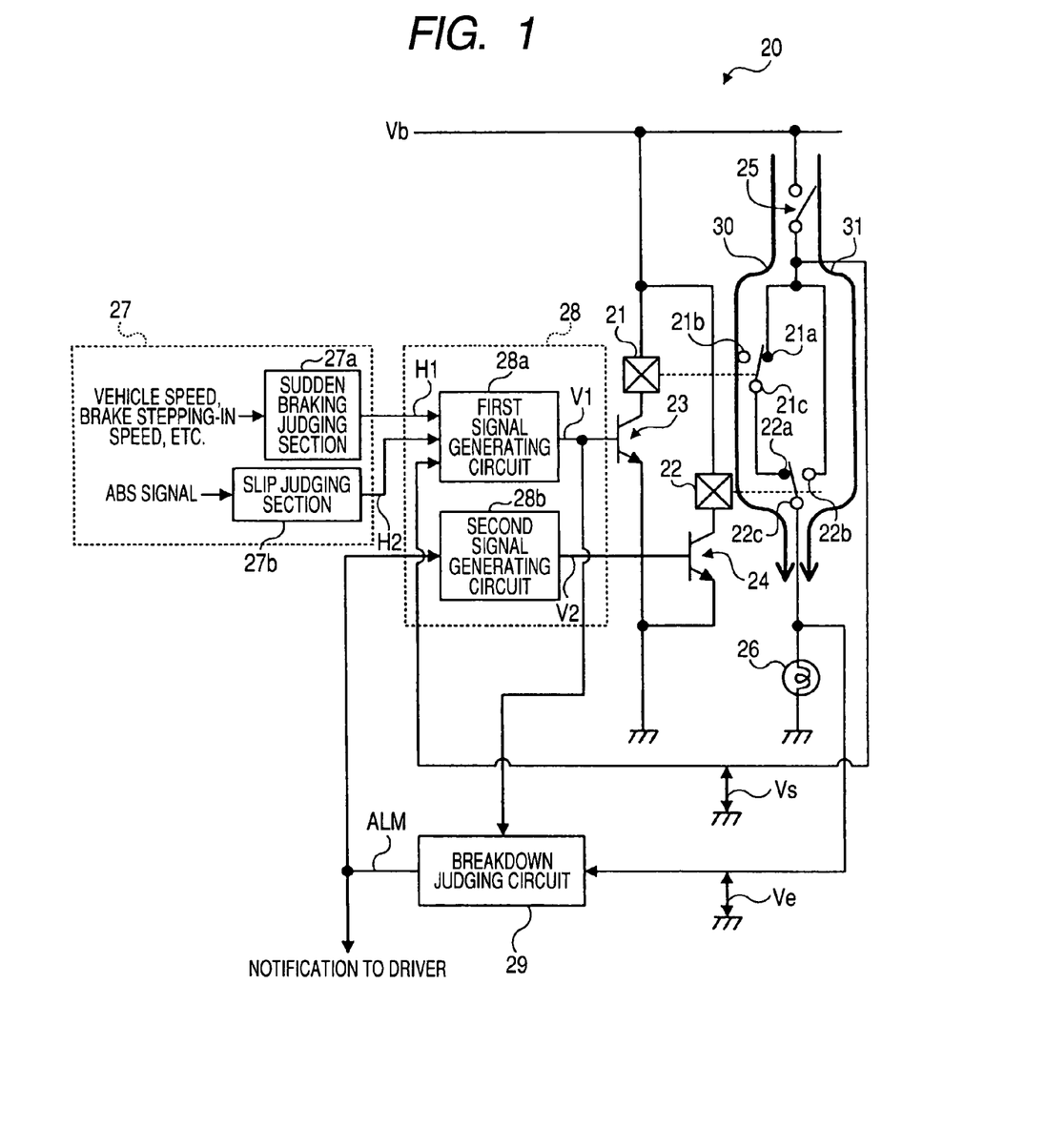
FIG. 1 is a constructional view of a stop lamp lighting controller in accordance with an embodiment mode.

FIG. 1 is a constructional view of a stop lamp lighting controller in accordance with the embodiment mode. In this figure, the stop lamp lighting controller 20 has a first relay 21, a second relay 22, a first transistor switch 23, a second transistor switch 24, a brake switch 25, a stop lamp 26, a braking state judging circuit 27, a lighting control circuit 28 and a breakdown judging circuit 29.

A battery voltage Vb is supplied to one end of each of the first relay 21 and the second relay 22. The other ends of the first relay 21 and the second relay 22 are respectively connected to collectors of the first transistor switch 23 and the second transistor switch 24. Further, each of emitters of the first transistor switch 23 and the second transistor switch 24 is connected to the ground. Further, a first lighting control signal V1 from the lighting control circuit 28 is inputted to a base of the first transistor switch 23. A second lighting control signal V2 from the lighting control circuit 28 is inputted to a base of the second transistor switch 24.

The first transistor switch 23 and the second transistor switch 24 are operated as "a three-terminal type switching element" for conducting or non-conducting switching terminals (collector and emitter) correspondingly to the electric potential of a control terminal (base).

In the idea of the invention, the first transistor switch 23 and the second transistor switch 24 may be set to any switch if such an operation (the three-terminal type switching element) can be realized. Namely, it is not limited to the illustrated transistor of a bipolar type. For example, it may be also set to a FET switch, or a mechanical switch of a relay, etc. A suitable switch may be selected by considering consumed electric power, cost, durability, response performance, etc.

The first relay 21 and the second relay 22 respectively have normally closed terminals 21a, 22a, normally open terminals 21b, 22b, and common terminals 21c, 22c. In a de-energizing state, connection is made between the normally closed terminals 21a, 22a and the common terminals 21c, 22c. In an energizing state, connection is made between the normally open terminals 21b, 22b and the common terminals 21c, 22c.

The battery voltage Vb is supplied to the normally closed terminal 21a of the first relay 21 through the brake switch 25. The common terminal 21c of the first relay 21 is connected to the normally closed terminal 22a of the second relay 22. The common terminal 22c of the second relay 22 is connected to the ground through the stop lamp 26. The normally open terminal 22b of the second relay 22 is connected to the normally closed terminal 21a of the first relay 21. The normally open terminal 21b of the first relay 21 is not connected to any portion, and is not used.

Two electrically conductive paths ("main line 30" and "subline 31") are defined to consider convenience of the following explanation. The main line 30 is an electrically conductive path of brake switch 25→normally closed terminal 21a of first relay 21→common terminal 21c of first relay 21→normally closed terminal 22a of second relay 22→common terminal 22c of second relay 22. The subline 31 is an electrically conductive path of brake switch 25→normally open terminal 22b of second relay 22→common terminal 22c of second relay 22.

Next, the constructions of the braking state judging circuit 27, the lighting control circuit 28 and the breakdown judging circuit 29 will be explained.

First, the braking state judging circuit 27 has a sudden braking judging section 27a and a slip judging section 27b. The sudden braking judging section 27a judges a sudden decelerating state of a vehicle. For example, this sudden decelerating state can be judged from a reducing degree of a vehicle speed, a changing degree of a brake stepping-in speed, etc. When the sudden braking judging section 27a judges the sudden decelerating state of the vehicle, the sudden braking judging section 27a outputs a sudden decelerating state judging signal H1 of a high level. The slip judging section 27b judges a slip state (a smooth running state of a drive wheel, etc.) of the vehicle. For example, this slip state can be judged from an ABS signal, etc. When the slip judging section 27b judges the slip state of the vehicle, the slip judging section 27b outputs a slip state judging signal H2 of a high level.

Next, the lighting control circuit 28 has a first signal generating circuit 28a and a second signal generating circuit 28b. The first signal generating circuit 28a normally outputs a first lighting control signal V1 of a low level. However, when the brake switch 25 is turned on and the sudden decelerating state judging signal H1 from the braking state judging circuit 27 becomes a high level or the slip state judging signal H2 becomes a high level, the first signal generating circuit 28a outputs the first lighting control signal V1 of a rectangular wave shape repeating the high level and the low level in a predetermined period. A turning-on judgment of the brake switch 25 can be made on the basis of a brake switch electric potential Vs pulled out of one end side (the lower side toward FIG. 1) of the brake switch 25. This is because the brake switch electric potential Vs becomes a high electric potential corresponding to the battery voltage Vb when the brake switch 25 is turned on.

The second signal generating circuit 28b normally outputs a second lighting control signal V2 of a low level. When a breakdown detecting signal ALM from the breakdown judging circuit 29 becomes a high level, the second signal generating circuit 28b outputs the second lighting control signal V2 of a high level inverted in logic.

The breakdown judging circuit 29 normally outputs the breakdown detecting signal ALM of a low level. When the breakdown judging circuit 29 judges an abnormality (breakdown) of the main line 30, the breakdown judging circuit 29 outputs the breakdown detecting signal ALM of a high level. A both-end voltage Ve of the stop lamp 26 and the first lighting control signal V1 are inputted to the breakdown judging circuit 29. The breakdown judging circuit 29 judges the abnormality (breakdown) of the main line 30 on the basis of these voltages and signals (the both-end voltage Ve and the first lighting control signal V1). A judging method will be explained later.

Figure 2A:
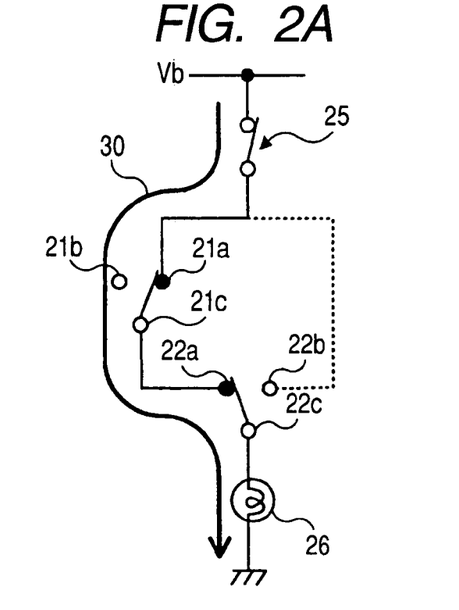
FIGS. 2A to 2C are forming views of a main line 30 and a subline 31.
Figure 2B:
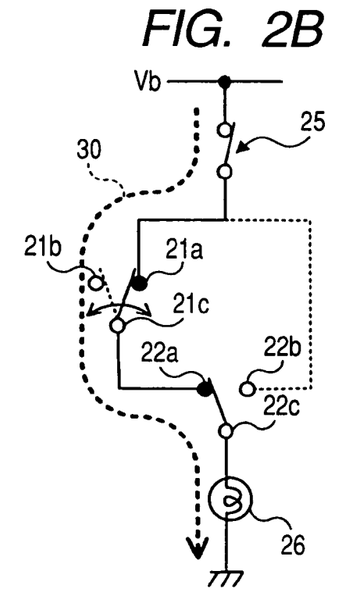
Figure 2C:
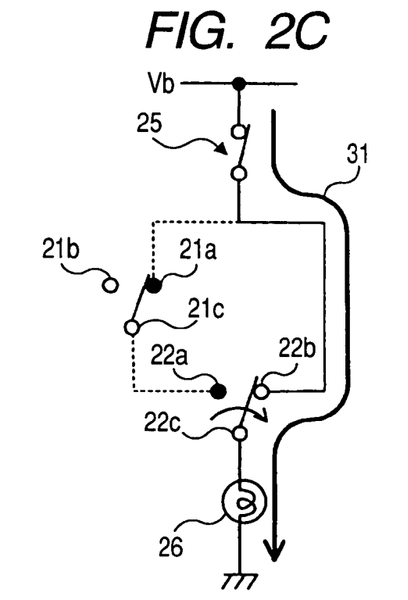

FIGS. 2A to 2C are forming views of the main line 30 and the subline 31. As shown in FIG. 2A, the main line 30 is an electrically conductive path from the brake switch 25 to the stop lamp 26 via the normally closed terminal 21a of the first relay 21, the common terminal 21c of the first relay 21, the normally closed terminal 22a of the second relay 22, and the common terminal 22c of the second relay 22. The relay terminal included within this path is only "the normally closed terminal". Accordingly, the main line 30 in FIG. 2A can be formed by controlling both the first relay 21 and the second relay 22 to a de-energizing state.

The main line 30 is also shown in FIG. 2B, but this main line 30 differs from the main line 30 of FIG. 2A in that the main line 30 of FIG. 2B is periodically disconnected and connected. With respect to a proper use of the main lines 30 of FIGS. 2A and 2B, the former is used for at a gentle braking time, and the latter is used for a sudden braking time.

Namely, both the first and second relays 21, 22 can be set to the de-energizing state and the main line 30 of FIG. 2A can be formed by fixing both the first and second lighting control signals V1, V2 from the lighting control circuit 28 of FIG. 1 to a low level. If a gentle braking state (i.e., the brake switch 25 is turned on) is generated in this state, the battery voltage Vb is supplied to the stop lamp 26 through this main line 30, and the stop lamp 26 can be lighted.

Further, if the first lighting control signal V1 repeats the high level and the low level in a predetermined period while the second lighting control signal V2 is fixed to the low level, the second relay 22 attains the de-energizing state and the first relay 21 attains a state periodically repeating opening and closing. Thus, the main line 30 of FIG. 2B periodically disconnected and connected can be formed. As explained before, the high level and the low level of the first lighting control signal V1 are repeated when the sudden decelerating state judging signal H1 from the braking state judging circuit 27 attains the high level or the slip state judging signal H2 attains the high level. Accordingly, the battery voltage Vb is finally intermittently supplied to the stop lamp 26 through the main line 30 of this disconnecting-connecting state at a sudden braking generating time, and the stop lamp 26 can be turned on and off.

Here, durability of the relay at a forming time of the main lines 30 of FIGS. 2A and 2B of the above two states will be verified. First, with respect to the main line 30 of FIG. 2A, each of the first and second relays 21, 22 is de-energized, and is not opened and closed. Accordingly, in this case, the remaining opening-closing time number until the maximum opening-closing time number of the relay is attained is not reduced. Accordingly, with respect to the main line 30 of FIG. 2A, it can be said that it almost does not exert an influence on the durability of the relay.

Next, with respect to the main line 30 of FIG. 2B, the first relay 21 periodically repeats opening and closing during the sudden braking state. Accordingly, in this case, the remaining opening-closing time number until the maximum opening-closing time number of the relay is attained is reduced after a while. Accordingly, with respect to the main line 30 of FIG. 2B, it exerts an influence on the durability of the first relay 21. However, generation frequency of the sudden braking state is very small in comparison with the gentle braking state, and is one time or no time through several months or one year unless a considerable rash operation is performed. Accordingly, if the formation of the main line 30 of FIG. 2B exerts an influence on the durability of the first relay 21, this influence is a degree able to be neglected.

For example, it is supposed that the sudden braking state of 100 times in a month (1200 times in one year) is generated at most. If the maximum opening-closing number of the first relay 21 is set to 1000000 times and the opening-closing number of the first relay 21 at the sudden braking time is five times per second and a sudden braking time of one time is set to five seconds, the opening-closing number per one sudden braking of the first relay 21 is five seconds×five times=25 times, and 1200 times×25 times=30000 times are attained for a year. Accordingly, a life of the first relay is calculated as 1000000 times÷30000 times≅33 (years). Accordingly, it is calculated that the life of the first relay 21 is exhausted in about 33 years. It can be said that this life of 33 years is a sufficiently long period with respect to the relay for vehicle mounting.

However, the case that the life of the relay is exhausted while no relay is exchanged for reasons of a vehicle operation, etc. might be rarely caused. Otherwise, there is also a possibility that the relay is broken irrespective of the life of the relay. It is necessary to take a safety measure at a relay breaking time so as to prepare for such a case.

The subline 31 shown in FIG. 2C is a safety measure for such a case. Namely, the breakdown judging circuit 29 of FIG. 1 normally outputs the breakdown detecting signal ALM of a low level. However, when the breakdown judging circuit 29 judges an abnormality (breakdown) of the main line 30, the breakdown judging circuit 29 outputs the breakdown detecting signal ALM of a high level. The second transistor switch 24 is turned on in response to this breakdown detecting signal ALM of the high level, and the second relay 22 is energized and the illustrated subline 31 is formed. Accordingly, at an abnormality (breakdown) generating time of the main line 30, the battery voltage Vb can be supplied to the stop lamp 26 through the subline 31. Accordingly, an automatic turning on and off function is lost, but a normal lighting function of the stop lamp 26 can be secured. Accordingly, no danger of traffic safety is generated.

Figure 3:
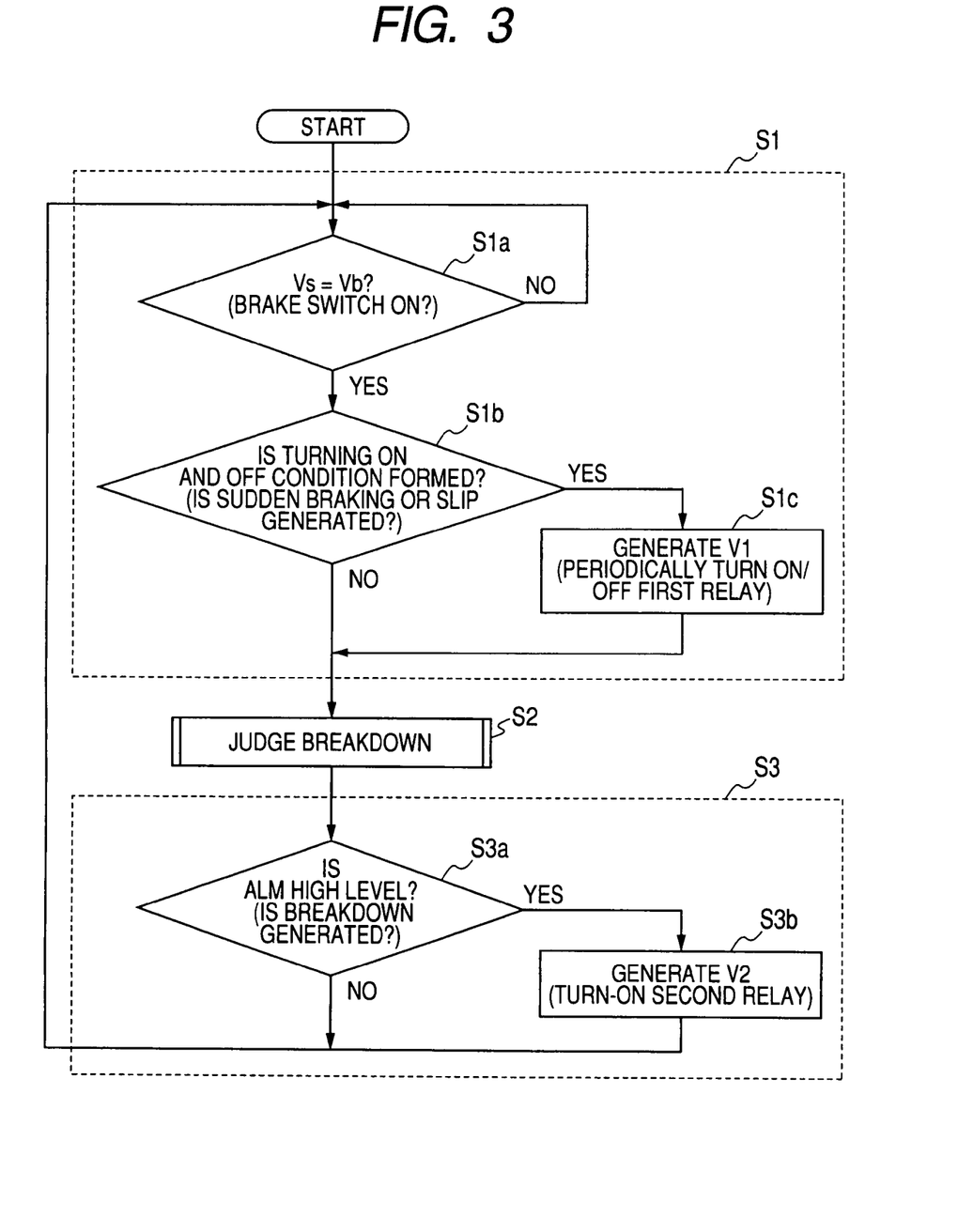
FIG. 3 is a view showing an operating flow chart of the stop lamp lighting controller in accordance with the embodiment mode.

FIG. 3 is a view showing an operating flow chart of the stop lamp lighting controller in accordance with the embodiment mode. This flow chart includes three processing sections of automatic turning on and off processing (step S1), breakdown judgment processing (step S2) and breakdown countermeasure processing (step S3).

In the first automatic turning on and off processing (step S1), it is judged whether the brake switch 25 is turned on or not, i.e., whether Vs=Vb is formed or not (step S1a). If no brake switch 25 is turned on, the judging step S1a is repeated. In contrast to this, when the brake switch 25 is turned on, the formation of a turning on and off condition of the stop lamp 26 is judged (step S1b). The turning on and off condition is a situation in which the sudden braking state is judged in the braking state judging section 27 (the sudden decelerating state judging signal H1 of a high level is output), or the slip state is judged (the slip state judging signal H2 of a high level is output).

When no turning on and off condition is formed, i.e., in the case of the gentle braking state, it proceeds to the breakdown judgment processing as it is (step S2). In contrast to this, when the turning on and off condition is formed, the first lighting control signal V1 of a rectangular wave shape repeating the high level and the low level in a predetermined period is output from the lighting control circuit 28 (step S1c) to periodically turn on/off (open and close) the first relay 21 and turn the stop lamp 26 on and off. It then proceeds to the breakdown judgment processing (step S2).

Figure 4:
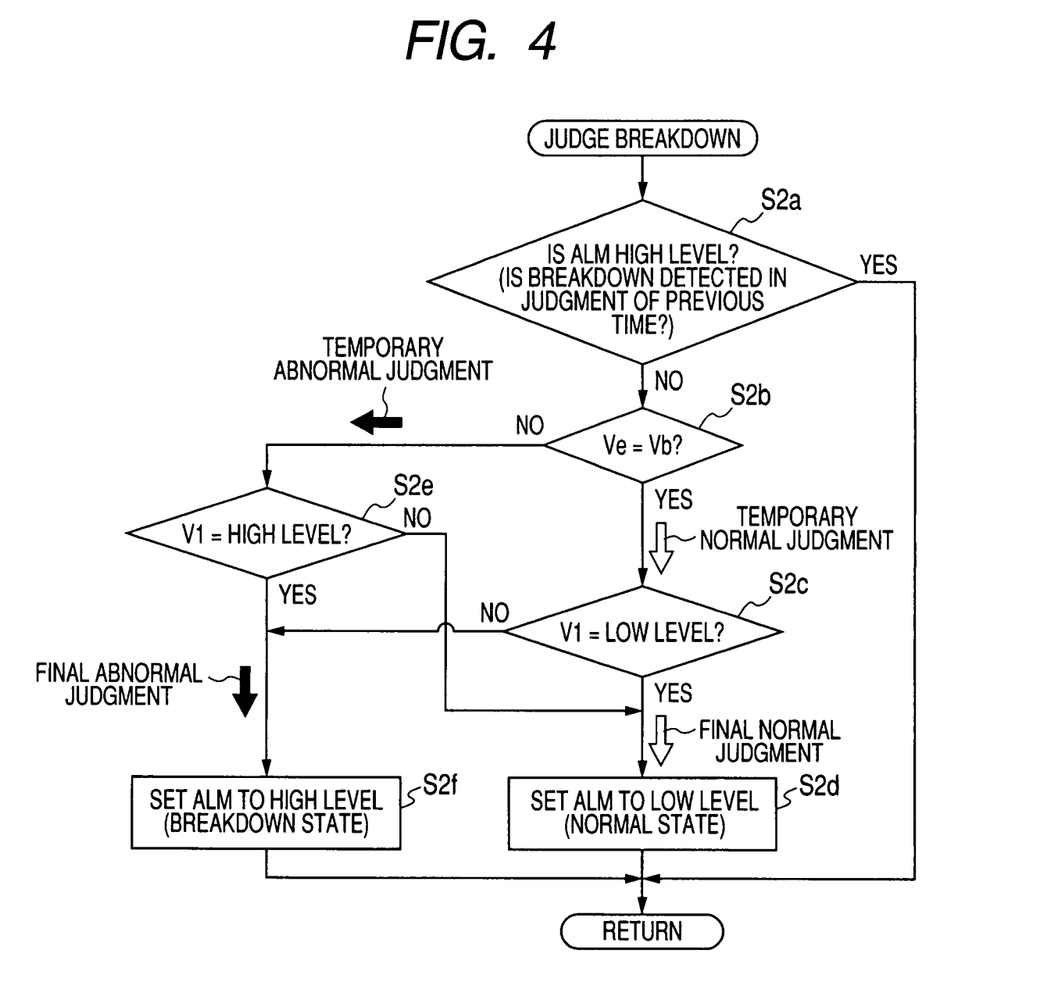
FIG. 4 is a view showing a subroutine flow of breakdown judgment processing (step S2).

FIG. 4 is a view showing a subroutine flow of the breakdown judgment processing (step S2). In this breakdown judgment processing (step S2), it is first judged whether a breakdown is detected in the breakdown judgment processing of the previous time or not (step S2a). This can be judged according to whether the breakdown detecting signal ALM already attains a high level or not. When the breakdown is detected in the breakdown judgment processing of the previous time, it proceeds to the breakdown countermeasure processing (step S3) of FIG. 3 by passing the flow as it is.

In contrast to this, when no breakdown is detected in the breakdown judgment processing of the previous time, it is next judged whether Ve=Vb is formed or not, i.e., whether the battery voltage Vb is supplied to the stop lamp 26 or not (step S2b). It is judged that Vs=Vb is already formed in the automatic turning on and off processing of the above step S1 (i.e., the brake switch 25 is turned on). Accordingly, Ve=Vb ought to be formed here.

When Ve=Vb is not formed, there is a possibility that an abnormality (e.g., a conductive defect, etc. caused by contact wearing of the normally closed terminal 21a of the first relay 21) is generated in some portion of the main line 30. However, at this stage, it is strictly "a possibility" for the following reasons. When turning on and off control of the stop lamp 26 is performed, the first relay 21 is periodically turned on/off. Therefore, the supply of the battery voltage Vb to the stop lamp 26 is stopped in a moment in its off period.

A case for judging that "Ve=Vb" is not formed in the step S2b is set to be called "a temporary abnormality judgment". Next, it is judged whether the first lighting control signal V1 is a high level or not (step S2e). When its judging result is YES, i.e., when Ve=Vb is not formed although it is a turning-on period of the first relay 21, it is finally judged (final abnormality judgment) that an abnormality is generated in the main line 30. The high level is set with respect to the breakdown detecting signal ALM (step S2f), and it then proceeds to the breakdown countermeasure processing (step S3) of FIG. 3 by passing the flow. In contrast to this, when no first lighting control signal V1 is the high level, Ve=Vb is naturally not formed and it is no abnormality of the main line 30. Accordingly, in this case, it is finally judged (final normal judgment) that the main line 30 is normal. The low level is set with respect to the breakdown detecting signal ALM (step S2d), and it proceeds to the breakdown countermeasure processing (step S3) of FIG. 3 by passing the flow.

In contrast to this, when Ve=Vb is judged in the step S2b, the main line 30 is normal. However, similar to the above case, there is "a possibility of normality" for the following reasons. When the turning on and off control of the stop lamp 26 is performed, it is correct that Ve=Vb is formed in the turning-on period of the first relay 21, but Ve=Vb is not formed in the turning-off period of the first relay 21. When a case for judging that "Ve=Vb" is formed in the step S2b is set to be called "a temporary normal judgment", it is next judged whether the first lighting control signal V1 is a low level or not (whether it is the turning-off period of the first relay 21 or not) (step S2c). When this judging result is YES, i.e., if Ve=Vb is formed in the turning-off period of the first relay 21, it is finally judged (final normal judgment) that the main line 30 is normal. The low level is set with respect to the breakdown detecting signal ALM (step S2d), and it then proceeds to the breakdown countermeasure processing (step S3) of FIG. 3 by passing the flow. In contrast to this, when the judging result of the step S2c is NO, i.e., if Ve=Vb is formed although it is the turning-on period of the first relay 21, it is finally judged (final abnormal judgment) that an abnormality is generated in the main line 30. The high level is set with respect to the breakdown detecting signal ALM (step S2f), and it then proceeds to the breakdown countermeasure processing (step S3) of FIG. 3 by passing the flow.

Thus, in the breakdown judgment processing of FIG. 4, when the brake switch 25 is turned on, "the final normal judgment" of the main line 30 is made and the low level showing the normal state is set with respect to the breakdown detecting signal ALM if Ve=Vb and V1=low level, or Ve≠Vb and V1≠high level are formed. In contrast to this, if Ve=Vb and V1≠low level or Ve≠Vb and V1=high level are formed, "the final abnormal judgment" of the main line 30 is made and the high level showing the abnormal state is set with respect to the breakdown detecting signal ALM.

In accordance with this embodiment mode, the following effects can be obtained by setting the above construction. First, at the gentle braking time, the first relay 21 and the second relay 22 are set to the de-energizing state as it is. Accordingly, no durability of these relays becomes worse. On the other hand, at the sudden braking time, the first relay 21 is opened and closed in a predetermined period (period of V1). Therefore, there is a fear that the durability of the first relay 21 is reduced by opening and closing the first relay 21. However, the generating frequency of the sudden braking is very small. Therefore, no durability is greatly damaged. For example, in the above calculating example, the life of the first relay 21 is about 33 years, and durability of about 12 times the life (2.7 years) of the beginning related art is obtained.

Next, in this embodiment mode, the braking state is divided into the gentle braking and the sudden braking, and the stop lamp 26 is lighted at the gentle braking time and is turned on and off at the sudden braking time. Accordingly, the stop lamp 26 can be turned on and off at only an emergent unavoidable time. Thus, it is possible to perform braking light display excellent in consideration with respect to a subsequent vehicle, etc.

The present invention is not limited to the construction of the above embodiment mode, but various developing examples and modified examples are naturally included within the scope of its technical idea. For example, the following example may be also used.

Figure 5:
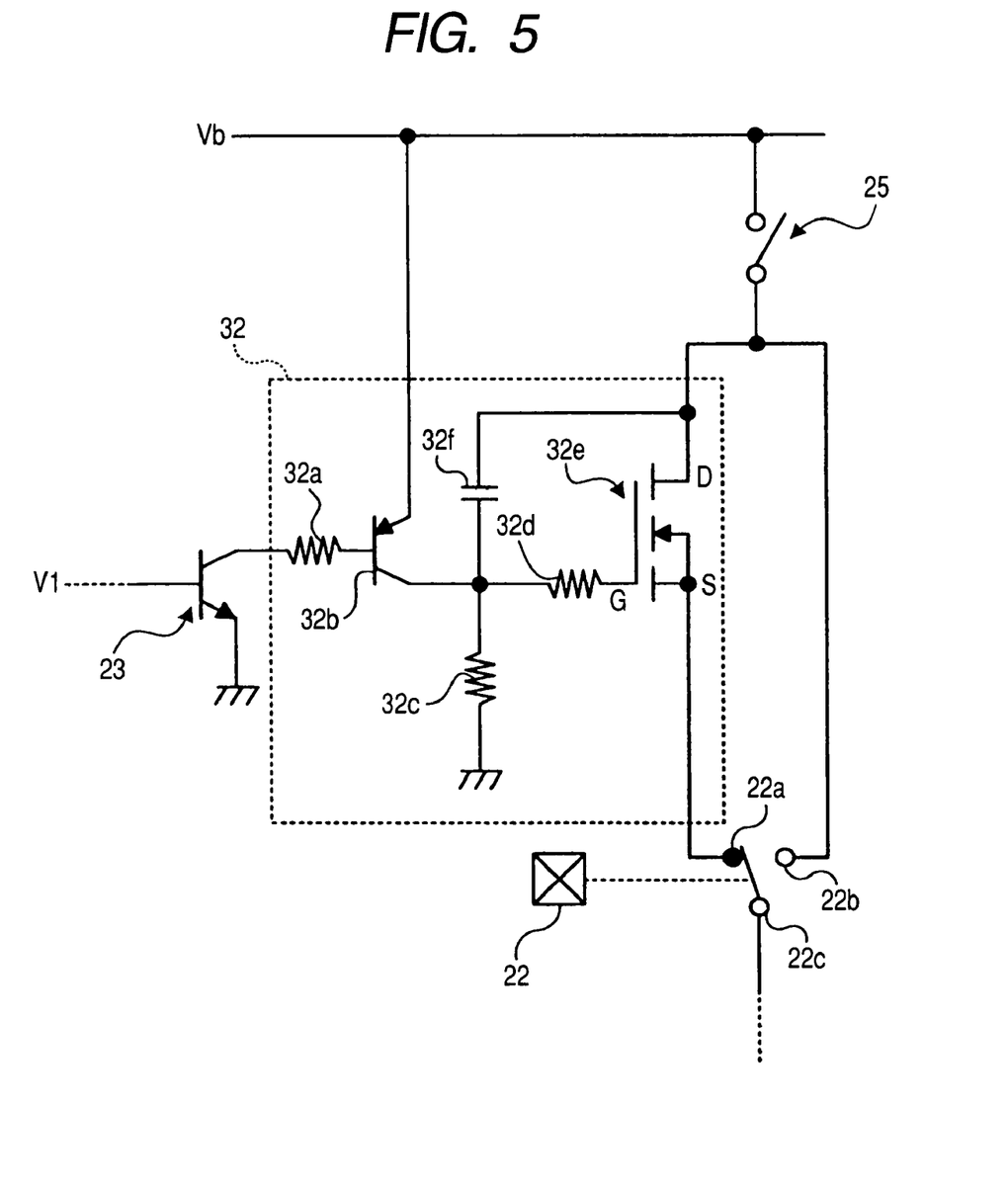
FIG. 5 is a constructional view of a semiconductor switch circuit 32 able to be used instead of a first relay 21.

FIG. 5 is a constructional view of a semiconductor switch circuit 32 able to be used instead of the first relay 21. In this figure, the semiconductor switch circuit 32 is constructed by a resistor 32a, a bipolar transistor switch 32b, resistors 32c, 32d, a FET switch 32e and a capacitor 32f.

Battery voltage Vb is supplied to an emitter of the bipolar transistor switch 32b. A base of the bipolar transistor switch 32b is connected to a collector of the first transistor switch 23 through the resistor 32a. Further, a collector of the bipolar transistor switch 32b is connected to the ground through the resistor 32c, and is also connected to a gate (G) of the FET switch 32e through the resistor 32d. A drain (D) of the FET switch 32e is connected to one end of the brake switch 25 and the normally open terminal 22b of the second relay 22. A source (S) of the FET switch 32e is connected to the normally closed terminal 22a of the second relay 22. The capacitor 32f is inserted between a gate (G) and a drain (D) of the FET switch 32e.

In the semiconductor switch circuit 32 of such a construction, the FET switch 32e is set to a turning-on state (a conducting state is set between S and D) at the gentle braking time. The FET switch 32e is periodically turned off/on in accordance with repetition of the high level and the low level of the first lighting control signal V1 at the sudden braking time.

Accordingly, the same operation and effect as the first relay 21 of the above embodiment mode can be obtained. In addition to this, the FET switch 32e has no mechanical contact such as the first relay 21. Therefore, durability is very high and life can be further extended in comparison with the first relay 21. Further, the peculiar effects of a reduction of noises provided by using no relay and a life improvement of the lamp are obtained.

What is claimed is:

1. A stop lamp lighting controller for supplying a battery voltage to a stop lamp through a braking detection switch element turned on at a braking operation time of a vehicle, and comprising:

a main line and a subline arranged in parallel between said braking detection switch element and the stop lamp;

a first relay for setting said main line to a conducting state in a de-energizing state, and setting said main line to a non-conducting state in an energizing state;

a second relay for selecting said main line in the de-energizing state and supplying the battery voltage from said braking detection switch element to said stop lamp through the main line, and selecting said subline in the energizing state and supplying the battery voltage from said braking detection switch element to said stop lamp through the subline;

sudden braking state judging means for judging a sudden braking state;

first control means for controlling said first relay to the de-energizing state when no sudden braking state is judged by said sudden braking state judging means, and also periodically controlling said first relay to the de-energizing state and the energizing state when the sudden braking state is judged by said sudden braking state judging means;

abnormality judging means for judging an abnormality of said main line; and second control means for controlling said second relay to the de-energizing state when no abnormality of said main line is judged by said abnormality judging means, and also controlling said second relay to the energizing state when the abnormality of said main line is judged by said abnormality judging means.

2. A stop lamp lighting controller for supplying a battery voltage to a stop lamp through a braking detection switch element turned on at a braking operation time of a vehicle, and comprising:

a main line and a subline arranged in parallel between said braking detection switch element and the stop lamp;

a switch circuit for setting said main line to a conducting state in a turning-on state, and setting said main line to a non-conducting state in a turning-off state;

a relay for selecting said main line in a de-energizing state and supplying the battery voltage from said braking detection switch element to said stop lamp through the main line, and selecting said subline in an energizing state and supplying the battery voltage from said braking detection switch element to said stop lamp through the subline;

sudden braking state judging means for judging a sudden braking state;

first control means for controlling said switch circuit to the turning-on state when no sudden braking state is judged by said sudden braking state judging means, and also periodically controlling said switch circuit to the turning-on state and the turning-off state when the sudden braking state is judged by said sudden braking state judging means;

abnormality judging means for judging an abnormality of said main line; and second control means for controlling said relay to the de-energizing state when no abnormality of said main line is judged by said abnormality judging means, and also controlling said relay to the energizing state when the abnormality of said main line is judged by said abnormality judging means.

* * * * *